United States Patent [19]
Fjermestad et al.

[11] 3,872,882
[45] Mar. 25, 1975

[54] MILK LINE NIPPLE PROTECTOR

[75] Inventors: Arnold R. Fjermestad; Clifford R. Brown, both of Albert Lea, Minn.

[73] Assignee: Universal Cooperatives, Inc., Albert Lea, Minn.

[22] Filed: Dec. 26, 1973

[21] Appl. No.: 428,378

[52] U.S. Cl. ............................. 137/381, 251/146
[51] Int. Cl. ............................................ F16k 51/00
[58] Field of Search ............ 251/145, 146; 137/381, 137/798, 799, 800; 285/45, 53, 55, 80, 226, 299, 300, 398

[56] References Cited
UNITED STATES PATENTS

| | | | |
|---|---|---|---|
| 1,433,662 | 10/1922 | Small | 137/381 X |
| 2,388,097 | 10/1945 | Turner | 285/45 X |
| 2,815,039 | 12/1957 | Pickavance | 137/381 |
| 3,010,739 | 11/1961 | Boudreau | 251/146 X |
| 3,347,566 | 10/1967 | Nelson | 285/45 X |

*Primary Examiner*—William R. Cline
*Attorney, Agent, or Firm*—Schroeder, Siegfried, Ryan & Vidas

[57] ABSTRACT

A milking machine milk line nipple assembly having a flexible resilient sleeve member with transverse corrugations formed therein secured to the milk line nipple at its inner end in telescoping encasing relation and having a rigid ring member at its outer end mounted in sliding relation to the nipple and being longitudinally compressible or collapsible relative to the nipple to permit ready attachment of the milking machine connector to the nipple and automatically return to contamination protective encasing relation to the nipple upon withdrawal of the milking machine connector.

6 Claims, 4 Drawing Figures

PATENTED MAR 25 1975 3,872,882

MILK LINE NIPPLE PROTECTOR

This invention relates to milking machine milk line nipple assemblies. More particularly, it relates to a milking machine nipple protector which is applied to the nipple of a milk line in conjunction with a resiliently urged closure member to effectively protect the milk line nipple against contamination.

It is a general object of our invention to provide a novel and improved means for protecting a milk line nipple from contamination and from eventually contaminating the interior of the milking machine connector and the milk line itself. A more specific object is to provide a novel and improved device which will automatically preclude the entrance of dirt and other contaminating material within the interior of a milk line connector when it is applied to the nipple of a milk line.

A more specific object is to provide a protective device for a milk line nipple which will completely encase the milk line nipple when it is not in use and can be readily moved to a non-interfering position when it is desired to apply the milking machine connector to the milk line nipple.

These and other objects and advantages of the invention will more fully appear from the following description, made in connection with the accompanying drawings, wherein like reference characters refer to the same or similar parts throughout the several views, and in which.

The preferred embodiment of our invention is shown in FIGS. 1-4. As shown, it is designed to be secured to a milk line 5 in surrounding and encasing relation to the laterally extending nipple 6 thereof. As shown, the milk line assembly includes a mounting bracket 7 which has an arcuate portion 8 designed to snap onto the milk line 5 to hold the same in proper position in opposition to the resilient urging of the closure member which is indicated generally by the numeral 9.

Figure 1:
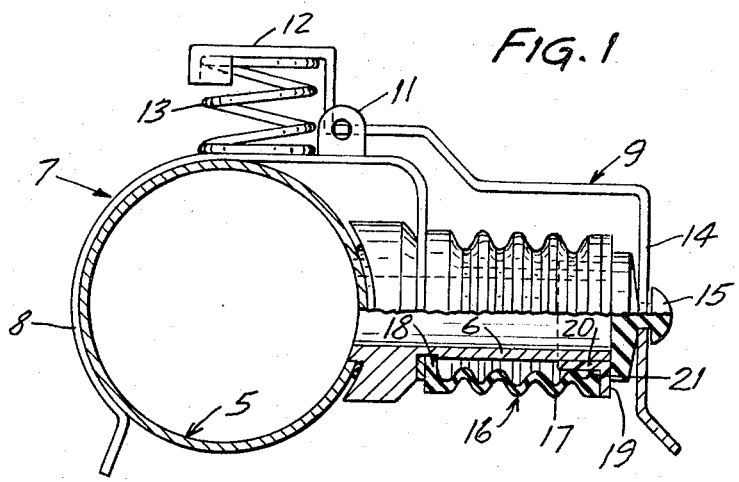
FIG. 1 is a side elevational view of a milk line nipple assembly including our nipple protector with portions broken away to show the construction thereof in section.
Figure 2:
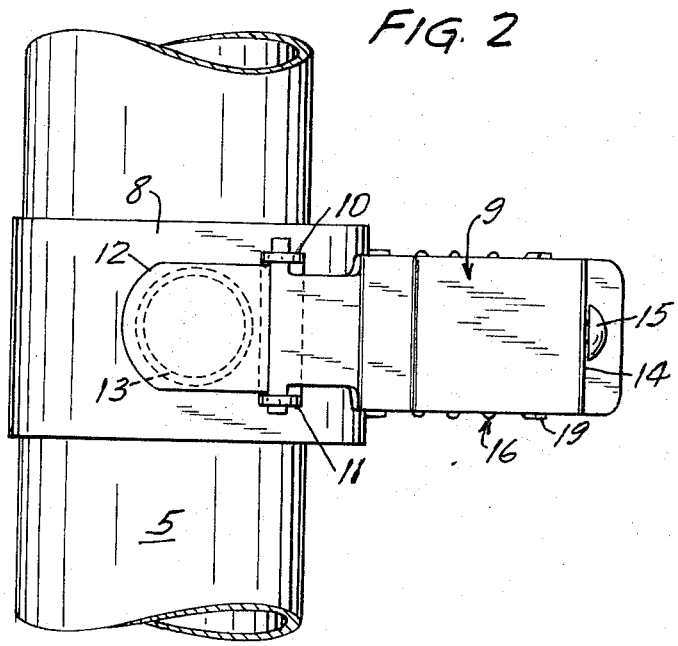
FIG. 2 is a top plan view of the same.
Figure 3:
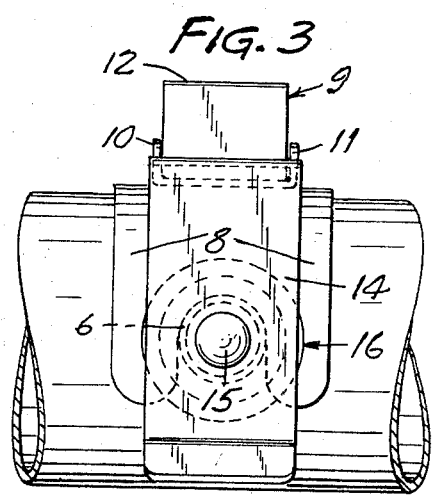
FIG. 3 is a front elevational view of the same.

The mounting bracket has a pair of spaced upstanding ears 10 and 11 which pivotally mount the closure member 9 as best shown in FIGS. 1 and 2. The closure member 9 has an upwardly and inwardly extending spring retaining element 12 which is adapted to retain a spring member 13, the lower end of which bears upon the upper surface of the bracket 7. This spring 13 continuously urges the outer end of the closure member downwardly toward closing positive relative to the open outer end of the nipple 6 as best shown in FIG. 1. The free end portion 14 of the closure member 9 carries a closure cap 15 which is of a size slightly larger than the diameter of the nipple 6 and bears against the open end thereof to effectively close the same and prevent air from entering therethrough when in closing position.

Secured to the inner end of the nipple 6 at its inner end is a rubber sleeve member which encases the nipple 6 and extends outwardly to a point adjacent the outer end of the nipple. This sleeve member 16 is made of a flexible resilient material and is readily longitudinally compressible, this action being facilitated by a plurality of transversely extending corrugations 17. A radially inwardly extending flange member 18 is carried at the inner end of the sleeve member 6 to secure the sleeve to the nipple 6 when it is moved to encasing position as shown in FIG. 1.

Carried by the outer end portion of the sleeve member 16 is a rigid plastic ring 19. This ring member has an inwardly extending tubular projection 20 which is engaged by the radially inwardly extending flange 21 carried by the outer end of the sleeve member 6. The interior diameter of the ring member 19 is such that it will readily slide longitudinally of the nipple 6 when a milk line connector 22 is applied to the outer end of the nipple as shown in FIG. 4.

In use, our milk line nipple assembly is applied to the milk line 5 as shown in FIG. 1 so that the spring 13 will constantly urge the closure member 9 to closed position. In this position, as shown in FIG. 1, the ring member 19 is constantly urged outwardly to bear against the closure cap 15, and thus the entire nipple is protected against contamination and air is prevented from entering the milk line while the milking machine is not applied to the nipple.

Figure 4:
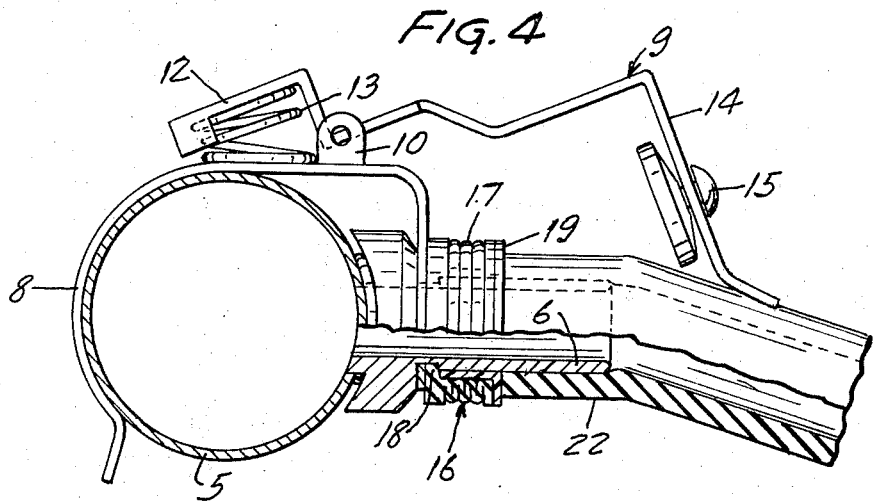
FIG. 4 is a partly-in-section side elevationa; view similar to that shown in FIG. 1 with the closure member of the milk line nipple assembly moved to open position and the nipple protector being collapsed as a result of application of the milking machine connector to the nipple.

When it is desired to apply a milk line connector 22 to the nipple 6, the closure member 9 is swung to the position shown in FIG. 4, and the connector is applied to the outer end of the nipple 6 by pressing the ring 19 inwardly and simultaneously longitudinally compressing the protector or sleeve member 16 as shown in FIG. 4. Thus while the milking machine is applied to the nipple, no portion of the nipple is exposed. When the connector 22 is withdrawn after the milking operation has been completed, the protecting sleeve 16 will immediately expand axially and carry the ring member 19 outwardly to the end of the nipple where it will bear against the inner surface of the closure member 15 as the latter returns to closing position as shown in FIG. 1. Thus the nipple will be constantly covered and protected against contamination and therefore the likelihood of contamination of the interior of the milk line connector upon subsequent application to the nipple is effectively prevented. As a consequence, the interior of the milk line and the milk itself is likewise protected from contamination.

Our improved milking machine milk line nipple assembly is simple, inexpensive, and highly effective, and provides a satisfactory solution to overcome the objections of sanitary officials who have in recent years been registering increased complaints and objections to sanitary conditions relative to the milk line nipple which heretofore has been permitted to remain in the open when not in use, with consequent collection of dirt and bacteria which upon application of the milk line connector thereto is projected into the interior of the connector itself and subsequently contaminates the milk.

It will, of course, be understood that various changes may be made in the form, details, arrangement and proportions of the parts without departing from the scope of the invention which consists of the matter shown and described herein and set forth in the appended claims.

What is claimed is:

1. A milking machine milk line nipple assembly comprising:
   a. a milk line,
   b. nipple structure extending laterally from said milk line and having an open outer end adapted to receive a milking machine connector line thereon,
   c. nipple closing mechanism carried by said milk line and including a closure member resiliently urged toward nipple-closing position across the open outer end of said nipple structure,
   d. a bellows-type sleeve member carried by said nipple structure is encased relation and extending along the major portion of the length thereof,
   e. said sleeve member being resiliently and compressible along its longitudinal axis, and
   f. a rigid ring member carried by the outer end portion of said sleeve member in axially aligned relation and having a bore only slightly greater than the exterior diameter of said nipple and terminating at the end of the nipple when said sleeve member is in non-compressed position and bearing against said closure member to cooperatively effectively prevent contamination of said nipple while not in use.

2. The structure defined in claim 1 wherein said sleeve member is made of a flexible resilient material and has a plurality of longitudinally spaced circumferentially extending corrugations formed therein to facilitate longitudinal compression relative to said sleeve member.

3. The structure defined in claim 1 wherein said sleeve member has an inner end portion and a radially inwardly extending annular flange element carried by said inner end portion and engaging the exterior of said nipple to secure said sleeve member thereto.

4. A nipple protector for milking machine milk lines comprising:
   a. a bellows-type sleeve member compressible along its longitudinal axis and having an inner diameter larger than that of such a nipple and being adapted to receive the same in telescoping surrounding relation;
   b. said sleeve member having an inner end portion and an outer end portion;
   c. said inner end portion of said sleeve member having a radially inwardly extending annular flange element adapted to engage the exterior of such a nipple when said sleeve member is slid thereover and to secure said member thereto; and
   d. a rigid ring member carried by the outer end portion of said sleeve member in axially aligned relation, said ring member having a bore only slightly greater than the exterior diameter of such a nipple and terminating at the end of the nipple when applied thereto in non-compressed position.

5. The structure defined in claim 4 wherein said sleeve member is comprised of a flexible resilient material.

6. The structure defined in claim 4 wherein said sleeve member is elongated and has a plurality of longitudinally spaced circumferentially extending corrugations formed therein to facilitate longitudinal compression thereof along the length of such a nipple when secured thereto in encasing relation.

* * * * *